(12) United States Patent
Wu et al.

(10) Patent No.: US 9,745,483 B2
(45) Date of Patent: Aug. 29, 2017

(54) STRETCHABLE INK COMPOSITION

(75) Inventors: Yiliang Wu, Oakville (CA); Qi Zhang, Milton (CA); Ke Zhou, Oakville (CA); Yu Qi, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 330 days.

(21) Appl. No.: 13/182,579

(22) Filed: Jul. 14, 2011

(65) Prior Publication Data

US 2013/0017373 A1   Jan. 17, 2013

(51) Int. Cl.
  *C09D 11/106* (2014.01)
  *C09D 11/322* (2014.01)
  *C09D 11/38* (2014.01)

(52) U.S. Cl.
  CPC .......... *C09D 11/322* (2013.01); *C09D 11/106* (2013.01); *C09D 11/38* (2013.01); *Y10T 428/24802* (2015.01)

(58) Field of Classification Search
  CPC ..... C09D 11/322; C09D 11/38; C09D 11/106; Y10T 428/24802
  USPC ................ 523/160, 161; 524/544, 545, 546
  See application file for complete search history.

(56) References Cited

U.S. PATENT DOCUMENTS

| 5,852,149 | A | * | 12/1998 | Abusleme ............ C08F 214/22 526/206 |
| 7,834,097 | B2 | | 11/2010 | Albano et al. |
| 7,855,254 | B2 | | 12/2010 | Abusleme et al. |
| 2003/0022018 | A1 | * | 1/2003 | Baumberg et al. ........... 428/690 |
| 2006/0222831 | A1 | | 10/2006 | Sloan |
| 2007/0059551 | A1 | * | 3/2007 | Yamazaki .................... 428/690 |
| 2010/0091052 | A1 | | 4/2010 | Ogawa et al. |
| 2010/0220268 | A1 | * | 9/2010 | Ohtani et al. ................. 349/106 |

* cited by examiner

*Primary Examiner* — Patrick Niland
(74) *Attorney, Agent, or Firm* — Marylou J. Lavoie, Esq. LLC

(57) ABSTRACT

Disclosed is a stretchable ink composition which comprises water, a colorant, a surfactant, and a fluoroelastomer.

17 Claims, No Drawings

STRETCHABLE INK COMPOSITION

BACKGROUND

Disclosed herein is an ink composition suitable for printing marks or images on deformable substrates. More specifically, disclosed herein is a stretchable ink composition.

Printing marks or images on deformable substrates is desirable for many applications, such as flexible medical devices, including surgical tools and implantable medical devices, robot skins, textiles (e.g. for stretchable swimming suits), rubber products such as tires, tubes, and cables, and the like. Consumable products based on rubbers and some textiles are also stretchable. Because of the highly deformable characteristic of the substrate, a stretchable ink is desired for printing on such substrates to achieve excellent image robustness and image longevity.

Accordingly, while known compositions and processes are suitable for their intended purposes, a need remains for improved ink compositions. In addition, a need remains for ink compositions suitable for printing on deformable or stretchable substrates. Further, a need remains for stretchable inks. Additionally, a need remains for stretchable inks that form robust images which can be stretched and relaxed for a high number of cycles. There is also a need for stretchable inks that have good color stability. In addition, there is a need for stretchable inks that exhibit good resistance to environmental factors such as light, chemicals, water, and oxidizing gases. Further, there is a need for stretchable inks that are suitable for outdoor applications. Additionally, there is a need for stretchable inks that generate hydrophobic and water-resistant images. A need also remains for stretchable inks that can be applied digitally.

SUMMARY

Disclosed herein is an ink composition comprising: (a) water, (b) a cosolvent, (c) a colorant, (d) a surfactant, and (e) a fluoroelastomer, said ink having a viscosity of no more than about 20 centipoise at the printing temperature. Also disclosed herein is a patterned article comprising: (1) a deformable substrate, and (2) an imagewise pattern thereon comprising: (a) a colorant, (b) a surfactant, and (c) a fluoroelastomer. Further disclosed herein is a process which comprises applying an ink which comprises (a) water, (b) a colorant, (c) a surfactant, and (d) a fluoroelastomer to a substrate in an imagewise pattern.

DETAILED DESCRIPTION

The inks disclosed herein contain an aqueous liquid vehicle. The liquid vehicle can consist solely of water, or it can comprise a mixture of water and a water soluble or water miscible organic component, referred to as a cosolvent, humectant, or the like (hereinafter cosolvent) such as alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. When mixtures of water and water soluble or miscible organic liquids are selected as the liquid vehicle, the water to organic ratio ranges in one embodiment from about 100:0 to about 30:70, and in another embodiment from about 97:3 to about 40:60, and in yet another embodiment from about 95:5 to about 60:40, although the ratio can be outside of these ranges. The non-water component of the liquid vehicle generally serves as a humectant or cosolvent which has a boiling point higher than that of water (100° C.). The organic component of the ink vehicle can also serve to modify ink surface tension, modify ink viscosity, dissolve or disperse the colorant, and/or affect the drying characteristics of the ink. In the ink compositions disclosed herein, the liquid vehicle can be present in one embodiment in an amount of from about 70 to about 99.9 percent by weight of the ink, and in another embodiment from about 80 to about 99.5 percent by weight of the ink, and in yet another embodiment from about 90 to about 99 percent by weight of the ink, although the amount can be outside these ranges.

The inks disclosed herein also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof. The dye is present in the ink composition in any desired or effective amount, in one embodiment from about 0.05 to about 15 percent by weight of the ink, in another embodiment from about 0.1 to about 10 percent by weight of the ink, and in yet another embodiment from about 1 to about 5 percent by weight of the ink, although the amount can be outside of these ranges.

Examples of suitable pigments include black pigments, white pigments, cyan pigments, magenta pigments, yellow pigments, or the like. Further, pigments can be organic or inorganic particles. Suitable inorganic pigments include, for example, carbon black. However, other inorganic pigments may be suitable such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW 18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer. Particle average diameters are in one embodiment from about 0.001 to about 5 microns, and in another embodiment from about 0.01 to about 1 micron, and in yet another embodiment from about 0.01 to about 0.5 micron, although the particle size can be outside these ranges. Within the ink compositions disclosed herein, the pigment is present in any effective amount to achieve the desired degree of coloration, in one embodiment in an amount of from about 0.1 to about 15 percent by weight of the ink, in another embodiment from about 1 to about 10 percent by weight of the ink, and in yet another embodiment from about 2 to about 7 percent by weight of the ink, although the amount can be outside these ranges.

The inks disclosed herein also contain a surfactant. Any surfactant that forms an emulsion of the fluoroelastomer in the ink can be employed. Examples of suitable surfactants include anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210™ IGEPAL CA-520™, IGEPAL CA-720™, IGEPAL CO-890™, IGEPAL CO-720™, IGEPAL CO-290™, IGEPAL CA-210™, ANTAROX 890™, and ANTAROX897™. Other examples of suitable nonionic surfactants include a block copolymer of polyethylene oxide and polypropylene oxide, including those commercially available as SYNPERONIC PE/F, such as SYNPERONIC PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used. The surfactant is present in any desired or effective amount, in one embodiment at least about 0.01 percent by weight of the ink, and in one embodiment no more than about 5 percent by weight of the ink, although the amount can be outside of these ranges.

The inks disclosed herein also contain a fluoroelastomer. An elastomer is defined by the Collins English Dictionary as any material, such as natural or synthetic rubber, that is able to resume its original shape when a deforming force is removed. A fluoroelastomer, for the purposes of the present disclosure, is a fluoropolymer that behaves according to this definition of an elastomer.

The elastomeric fluoropolymer can be a perfluoropolymer or it can contain atoms other than carbon and fluorine, such as hydrogen, chlorine and other halogens, oxygen, nitrogen, sulfur, silicon, and the like, as well as mixtures thereof. The term "fluoropolymer" is intended to denote any polymer comprising more than 25 percent by weight of recurring monomer units derived from at least one ethylenically unsaturated monomer comprising at least one fluorine atom (hereinafter, fluorinated monomer). When the fluorinated monomer is free of hydrogen atoms and contains other halogen atoms, it is referred to as a per(halo)fluoromonomer. When the fluorinated monomer contains hydrogen atoms, it is referred to as a hydrogen-containing fluorinated monomer. Examples of common fluorinated monomers include, but are not limited to, tetrafluoroethylene (TFE); $C_3$-$C_8$ perfluoroolefins, such as hexafluoropropene (HFP); $C_2$-$C_8$ hydrogenated monofluoroolefins, such as vinyl fluoride; vinylidene fluoride (VdF); 1,2-difluoroethylene and trifluoroethylene; perfluoroalkylethylenes complying with formula $CH_2=CH-R_{f0}$, in which $R_{f0}$ is a $C_1$-$C_6$ perfluoroalkyl, chloro- and/or bromo- and/or iodo-$C_2$-$C_6$ fluoroolefins, like chlorotrifluoroethylene (CTFE); (per)fluoroalkylvinylethers (PAVE) complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$; $CF_2=CFX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl; (per)fluoromethoxyalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like $-C_2F_5-O-CF_3$; functional (per)fluoroalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form; fluorodioxoles, especially perfluorodioxoles; and the like. Copolymers of two or more fluorinated monomers are also possible.

The fluoropolymer can be a copolymer containing fluorinated monomers as well as hydrogenated monomers (a term referring to monomers free of fluorine atoms for the purposes of the present disclosure). Examples of suitable hydrogenated monomers include, but are not limited to, ethylene, propylene, vinyl monomers such as vinyl acetate, acrylic monomers, such as methyl methacrylate, acrylic acid, methacrylic acid, ethylacrylate, n-butylacrylate, hydroxypropylacrylate, (hydroxy)ethylhexylacrylate, and hydroxyethyl acrylate, and the like, styrene monomers, like styrene and p-methylstyrene, vinyl ethers, such as propylvinylether, cyclohexylvinylether, vinyl-4-hydroxybutylether, unsaturated carboxylic acids, such as vinylacetic acid, and the like, as well as mixtures thereof.

Some specific examples of suitable fluoroelastomers include (but are not limited to) fluoro rubbers of the polymethylene type that use vinylidene fluoride as a comonomer and have substituent fluoro, alkyl, perfluoroalkyl, or perfluoroalkyoxy groups in the polymer chain, with or without a curesite monomer, such as copolymers of vinylidene fluoride and hexafluoropropylene; terpolymers of vinylidene fluoride, hexafluoropropylene, and tetrafluoroethylene; copolymers of vinylidene fluoride and (per)fluoromethoxyalkylvinylethers; terpolymers of vinylidene fluoride, hexafluoropropylene, and polyperfluoromethylvinylether; terpolymers of vinylidene fluoride, tetrafluoroethylene, and a fluorinated vinyl ether; terpolymer of vinylidene fluoride, tetrafluoroethylene, and propylene; tetrapolymers of vinylidene fluoride, hexafluoropropylene, tetrafluoroethylene, and polyperfluoromethylvinylether; terpolymers of tetrafluoroethylene, propylene, and vinylidene fluoride; pentapolymers of tetrafluoroethylene, hexafluoroethylene, vinylidene fluoride, ethylene, and polyperfluoromethylvinylether; perfluoro rubbers of the polymethylene type having all substituent groups on the polymer chain either fluoro, perfluoroalkyl, or perfluoroalkyoxyl groups; fluoro rubbers of the polymethylene type containing one or more of the monomeric alkyl, perfluoroalkyl, and/or perfluoroalkoxy groups with or without a curesite monomer; and the like, as well as mixtures thereof. One specific example of a suitable fluoroelastomer is commercially available as TECNOFLON® TN latex from Solvay Solexis. Other commercially available fluoroelastomers such as VITON® from DuPont, DYNEON™ from 3M, AFLAS®, DAI-EL™ from Daikin, and the like can be used as well.

In one embodiment, the fluoroelastomer has a fluorine content of at least about 5 weight %, in another embodiment at least about 10 weight %, and in yet another embodiment at least about 30 weight %, and in one embodiment no more than about 76 weight % (perfluoroelastomer), in another embodiment no more than about 70 weight %, and in yet another embodiment no more than about 68 weight %, although the fluorine content can be outside of these ranges.

In one embodiment, the fluoroelastomer has a tensile strength of at least about 3 MPa, in another embodiment at least about 4 MPa, and in yet another embodiment at least about 7 MPa, and in one embodiment no more than about 25

MPa, in another embodiment no more than about 20 MPa, and in yet another embodiment no more than about 18 MPa, as measured by ASTM D412C, although the tensile strength can be outside of these ranges.

In one embodiment, the fluoroelastomer has an elongation at break of at least about 150%, in another embodiment at least about 200%, and in yet another embodiment at least about 400%, and in one embodiment no more than about 1100%, in another embodiment no more than about 1000%, and in yet another embodiment no more than about 800%, as measured by ASTM D412C, although the elongation at break can be outside of these ranges.

In one embodiment, the fluoroelastomer has a hardness (Shore A) value of at least about 20, in another embodiment at least about 30, and in yet another embodiment at least about 40, and in one embodiment no more than about 90, in another embodiment no more than about 85, and in yet another embodiment no more than about 80, as measured by ASTM 2240, although the hardness can be outside of these ranges.

In one embodiment, the fluoroelastomer has a glass transition temperature of at least about −70° C., in another embodiment at least about −50° C., and in yet another embodiment at least about −40° C., and in one embodiment no more than about 25° C., in another embodiment no more than about 0° C., and in yet another embodiment no more than about −10° C., although the Tg can be outside of these ranges.

The fluoroelastomer is present in the ink in any desired or effective amount, in one embodiment at least about 0.1 percent by weight of the ink, in another embodiment at least about 1 percent by weight of the ink, and in yet another embodiment at least about 2 percent by weight of the ink, and in one embodiment no more than about 25 percent by weight of the ink, in another embodiment no more than about 20 percent by weight of the ink, and in yet another embodiment no more than about 15 percent by weight of the ink, although the amount can be outside of these ranges.

The ink composition can further comprise crosslinkers. In embodiments, the crosslinker is an organoamine, a dihydroxy aromatic compound, a peroxide, a metal oxide, or the like, as well as mixtures thereof. Crosslinking can further enhance the physical properties of the images generated from the ink composition. The crosslinker can be present in any desired or effective amount, in one embodiment at least about 0.1 percent by weight of the ink, in another embodiment at least about 1 percent by weight of the ink, and in yet another embodiment at least about 5 percent by weight of the ink, and in one embodiment no more than about 20 percent by weight of the ink, in another embodiment no more than about 15 percent by weight of the ink, and in yet another embodiment no more than about 10 percent by weight of the ink, although the amount can be outside of these ranges.

Other optional additives to the inks include biocides, fungicides, pH controlling agents such as acids or bases, phosphate salts, carboxylates salts, sulfite salts, amine salts, buffer solutions, and the like, sequestering agents such as EDTA (ethylene diamine tetra acetic acid), viscosity modifiers, leveling agents, and the like, as well as mixtures thereof.

In one embodiment, the ink composition is a low-viscosity composition. The term "low-viscosity" is used in contrast to conventional high-viscosity inks such as screen printing inks, which tend to have a viscosity of at least 1,000 cps. In specific embodiments, the ink disclosed herein has a viscosity of in one embodiment no more than about 100 cps, in another embodiment no more than about 50 cps, and in yet another embodiment no more than about 20 cps, although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is in one embodiment at least about 1 centipoise and in one embodiment is no more than about 10 centipoise, in another embodiment no more than about 7 centipoise, and in yet another embodiment no more than about 5 centipoise, although the viscosity can be outside of these ranges. For example, for piezoelectric ink jet printing, at the jetting temperature, the ink viscosity is in one embodiment at least about 2 centipoise, and in another embodiment at least about 3 centipoise, and in one embodiment is no more than about 20 centipoise, in another embodiment no more than about 15 centipoise, and in yet another embodiment no more than about 10 centipoise, although the viscosity can be outside of these ranges. The jetting temperature can be as low as about 20 to 25° C., and can be in one embodiment as high as about 90° C., in another embodiment as high as about 60° C., and in yet another embodiment as high as about 40° C., although the jetting temperature can be outside of these ranges.

The ink compositions can be of any suitable or desired pH. For some embodiments, such as thermal ink jet printing processes, pH values in one embodiment are at least about 2, in another embodiment at least about 3, and in yet another embodiment at least about 5, and in one embodiment up to about 11, in another embodiment up to about 10, and in yet another embodiment up to about 9, although the pH can be outside of these ranges.

The ink compositions in one embodiment have a surface tension of at least about 22 dynes per centimeter, in another embodiment at least about 25 dynes per centimeter, and in yet another embodiment at least about 28 dynes per centimeter, and in one embodiment no more than about 40 dynes per centimeter, in another embodiment no more than about 38 dynes per centimeter, and in yet another embodiment no more than about 35 dynes per centimeter, although the surface tension can be outside of these ranges.

The ink compositions in one embodiment contain particulates having an average particle diameter of no larger than about 5 µm, in another embodiment no larger than about 2 µm, in yet another embodiment no larger than about 1 µm, and in still another embodiment no larger than about 0.5 µm, although the particulate size can be outside of these ranges. In specific embodiments, the fluoroelastomer is in an emulsion form in the ink, having an average particle diameter of in one embodiment no larger than about 2 µm, in another embodiment no larger than about 1 µm, and in yet another embodiment no larger than about 0.5 µm, although the particulate size can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in one embodiment from about 5 to about 10 minutes. Alternatively, the optional ink additives can be mixed with the other ink ingredients during the ink preparation process, which takes place according to any desired procedure, such as by mixing all the ingredients, heating if desired, and filtering.

In a specific embodiment, the inks are prepared as follows: 1) preparation of an emulsion of the fluoroelastomer stabilized with a first surfactant; 2) preparation of a dispersion of a colorant stabilized with a second surfactant; 3) mixing of the fluoroelastomer emulsion with the colorant dispersion; 4) optional filtering of the mixture; 5) addition of other additives such as co-solvents; and 6) optional filtering of the composition. In specific embodiments, the first surfactant is compatible with the second surfactant. In further embodiments, the first surfactant is the same as the second surfactant. The phrase "compatible" means that there is an absence of naturalization (pH or charge) or reaction between them. The best indication of this is that no major or large agglomerates form after mixing the fluoroelastomer emulsion and the colorant dispersion. This can be characterized by particle size measurement. For example, the particle size of the mixture is substantially the same as that before mixing.

Also disclosed herein is a process which comprises applying an ink composition as disclosed herein to a substrate in an imagewise pattern.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, the process entails printing the ink onto a deformable substrate, such as textile, rubber sheeting, plastic sheeting, or the like. In some embodiments, the substrate is a stretchable substrate, such as textile or rubber sheets. In other embodiments, the substrate is a plastic which is deformable at an elevated temperature higher than the glass transition temperature of the plastic, for example, in the process of molding into 3-dimensional objects. When the ink disclosed herein is used, the imagewise pattern will not be damaged upon molding. The rubber sheets with the imagewise pattern can be used, for example, as wrap for a 3-D object.

In one embodiment, the inks disclosed herein can be printed on a rubber substrate, such as natural polyisoprene, polybutadiene rubber, chloroprene rubber, neoprene rubber, butyl rubber (copolymer of isobutylene and isoprene), styrene-butadiene rubber, silicon rubber, nitrile rubber (which is a copolymer of butadiene and acrylonitrile), ethylene propylene rubber, ethylene propylene diene rubber, epichlorohydrin rubber, polyacrylic rubber, ethylene-vinyl acetate, polyether block amides, polysulfide rubber, chlorosulfonated polyethylene as Hypalon, or the like. In a specific embodiment, the inks disclosed herein can be printed on a silicon rubber, polyacrylic rubber, butyl rubber, or neoprene rubber substrate and the imaged substrate can be stretched in one axial direction (i.e., along the x-axis, as opposed to both the x-axis and the y-axis) to in one embodiment at least 110%, in another embodiment at least 150%, and in yet another embodiment at least 200%, of the length of its original dimension in one embodiment at least about 50 times, in another embodiment at least about 100 times, and in yet another embodiment at least about 500 times, without exhibiting cracks or delamination.

In one embodiment, the inks disclosed herein can be printed on a silicon rubber, polyacrylic rubber, butyl rubber, or neoprene rubber substrate and the imaged substrate can be submerged in water for in one embodiment at least about 1 day, in another embodiment for at least about 1 week, and in yet another embodiment for at least about 1 month, without exhibiting damage to the imagewise pattern.

In a specific embodiment, the images generated with the inks disclosed herein are highly water-resistant. In one embodiment, images generated with the inks exhibit a water droplet contact angle of at least about 80°, in another embodiment at least about 90°, and in yet another embodiment at least about 95°, although the contact angle can be outside of these ranges. The water-resistant characteristic renders the ink disclosed herein suitable for outdoor applications or printing on water-related products such vehicle wrap, swimming suits, and the like.

In a specific embodiment, the images generated with the inks disclosed herein have a good chemical resistance. For example, they can exhibit good to excellent resistance toward alcohols, acetic acid, acetamide, allyl bromide, allyl chloride, benzoyl chloride, ethers, esters, hydrocarbons, blood, salt solutions, and the like.

In one embodiment, the images generated with the inks disclosed herein have a tensile strength of at least about 3 MPa, in another embodiment at least about 4 MPa, and in yet another embodiment at least about 8 MPa, and in one embodiment no more than about 25 MPa, in another embodiment no more than about 20 MPa, and in yet another embodiment no more than about 18 MPa, as measured by ASTM D412C, although the tensile strength can be outside of these ranges.

In one embodiment, the images generated with the inks disclosed herein have an elongation at break of at least about 150%, in another embodiment at least about 200%, and in yet another embodiment at least about 400%, and in one embodiment no more than about 1000%, in another embodiment no more than about 800%, and in yet another embodiment no more than about 700%, as measured by ASTM D412C, although the elongation at break can be outside of these ranges. Generally, the images have a larger elongation at break than that of the deformable substrate.

In one embodiment, the images generated with the inks disclosed herein have a hardness (Shore A) value of at least about 20, in another embodiment at least about 30, and in yet another embodiment at least about 40, and in one embodiment no more than about 100, in another embodiment no more than about 90, and in yet another embodiment no more than about 85, as measured by ASTM 2240, although the hardness can be outside of these ranges.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

A fluoroelastomer emulsion (TECNOFLON® TN latex, Solvay Solexis Inc., West Deptford, N.J., solids content 64.91 wt %) was mixed with Pigment Green 7 pigment dispersion (solid contents 19.96%, also containing sodium dodecyl benzene sulfonate surfactant in an amount of 2 wt. %) to form a homogenous dispersion in which the solids content contained 5 wt. % pigment. Particle sizes were measured with a Nanotrac™ 252 (Microtrac, Montgomeryville, Pa., USA) at room temperature to confirm the compatibility of these two dispersions. The TECNOFLON® TN latex had an average particle size of about 230 nm, and the Pigment Green 7 pigment dispersion had an average particle size of about 100 nm. The two dispersions were mixed together very well without any agglomerates. After mixing, the mixture exhibited a particle size distribution of from about 40 nm to about 300 nm with an average particle size about 120 nm.

To demonstrate a robust printed image, the above mixture was first diluted with distilled water until a suitable viscosity (~5 cps) was achieved for ink jet printing. Ethylene glycol was then added into the diluted mixture at a 1:9 ratio (1 part by weight ethylene glycol per 9 parts by weight mixture) to prevent the dispersion from drying in the nozzle. This jettable ink was printed on a natural latex rubber substrate (latex glove) using a DMP-2800 ink jet printer (Fuji Film Dimatix, Santa Clara, Calif.) equipped with 10 pL cartridges (DMC-11610). After printing, the ink solvents were dried at 60° C. for about 5 min. The images could be stretched in both directions up to 500% (which was the limit of the substrate). After hundreds of stretch-relaxation cycles, the images stayed firmly on the substrate without any damage such as cracks or de-lamination. The printed images also tested against water exposure by brushing them under water. No visible damage was observed.

EXAMPLE II

The process of Example I was repeated except that a polydimethylsiloxane (PDMS) silicon rubber substrate was used. The PDMS substrate was made in the laboratory using Dow Corning SYLGARD 184 kit. Similar results were obtained. The printed image could be stretched up to 200% (limit of the PDMS substrate) for hundreds of cycles without visible damage.

EXAMPLE III

The process of Example I was repeated except that a white $TiO_2$ pigment dispersion having an average particle size of 120 nm was used instead of the Pigment Green 7. $TiO_2$ nanoparticles purchased from Nanophase Technologies Corporation (Burr Ridge, Ill., USA) were first dispersed in water with the assistance of sodium dodecyl benzene sulfonate surfactant (2 wt %) to from a stable dispersion at 20 wt % solids content. The dispersion was mixed with the fluoroelastomer TECNOFLON® TN latex at 10 wt % pigment loading. The stretchable ink showed similar printability and stretchability to that of Example I.

EXAMPLE IV

The process of Example I is repeated except that another fluoroelastomer, DYNEON™ FX 10180 fluoroelastomer (terpolymer latex of vinylidene fluoride, hexafluoropropylene, and tetrafluoroethylene) is used instead of the TECNOFLON® TN. It is believe that similar results will be observed.

EXAMPLE V

The process of Example I is repeated except that except that a water soluble dye, Basacid Black X38 liquid (BASF), is used instead of the Pigment Green 7 dispersion. It is believe that similar results will be observed, with the possible exception of less waterfastness behavior than the images of Example I.

Comparative Example A

For comparative purposes, a conventional ink (DMP model fluid, #MFL001, Fuji Film Dimatix) was printed and dried on the same rubber substrate as that of Example I. Although the fresh prints stayed well on the substrate, the images could be easily wiped off after a few stretch-relaxation cycles. This result indicated that the conventional ink was not stretchable or robust under stretching conditions. After several stretch-relaxation cycles, local delamination and many fine cracks developed, and the images could be wiped off the substrate.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. An ink composition comprising:
   (a) water,
   (b) a cosolvent,
   (c) a colorant,
   (d) a surfactant,
   (e) a fluoroelastomer, and
   a crosslinker selected from the group consisting of a dihydroxy aromatic compound, a peroxide, a metal oxide, and mixtures thereof;
   said ink composition having a viscosity of 2 centipoise to 20 centipoise at the printing a jetting temperature of 20° C. to 90° C. the ink composition having the characteristic that an imagewise pattern formed on a deformable substrate with the ink composition can be stretched along one axis to at least 110% of the length of its original dimension at least about 50 times without exhibiting cracking or delamination from the substrate.

2. An ink according to claim 1 wherein the cosolvent is ethylene glycol, propylene glycol, diethylene glycol, glycerine, dipropylene glycol, polyethylene glycol, polypropylene glycol, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, urea, thiourea, ethylene urea, alkylurea, alkylthiourea, dialkylurea, dialkylthiourea, 2-methylpentanoic acid, 2-ethyl-3-propylacrylic acid, 2-ethyl-hexanoic acid, 3-ethoxyproponic, acid, sulfolane, carbitol, butyl carbitol, cellusolve, tripropylene glycol monomethyl ether, N-methylpyrrolidinone, 2-pyrrolidinone, cyclohexylpyrrolidone, methyl sulfonylethanol, imidazole, 1,3-dimethyl-2-imidazolidinone, betaine, 1-deoxy-D-galactitol, mannitol, inositol, formamide, acetamide, or mixtures thereof.

3. An ink according to claim 1 wherein the colorant is a pigment.

4. An ink according to claim 1 wherein the surfactant is a cationic surfactant.

5. An ink according to claim 1 wherein the fluoroelastomer is (a) a copolymer of vinylidene fluoride and hexafluoropropylene; (b) a terpolymer of vinylidene fluoride, hexafluoropropylene, and tetrafluoroethylene; (c) a copolymer of vinylidene fluoride and (per)fluoromethoxyalkylvinylether (d) a terpolymer of vinylidene fluoride, hexafluoropropylene, and polyperfluoromethylvinylether; (e) a terpolymer of vinylidene fluoride, tetrafluoroethylene, and a fluorinated vinyl ether; (f) a terpolymer of vinylidene fluoride, tetrafluoroethylene, and propylene; (g) a tetrapolymer of vinylidene fluoride, hexafluoropropylene, tetrafluoroethylene, and polyperfluoromethylvinylether;

(h) a terpolymer of tetrafluoroethylene, propylene, and vinylidene fluoride; (i) a pentapolymer of tetrafluoroethylene, hexafluoroethylene, vinylidene fluoride, ethylene, and polyperfluoromethylvinylether; or (j) a mixture thereof.

6. An ink according to claim 1 wherein the fluoroelastomer has a fluorine content of from about 5 to about 76 weight percent.

7. An ink according to claim 1 wherein the fluoroelastomer has a tensile strength of from about 3 to about 25 MPa.

8. An ink according to claim 1 wherein the fluoroelastomer has an elongation at break of from about 150 to about 1100%.

9. An ink according to claim 1 wherein the fluoroelastomer has a Shore A hardness value of from about 20 to about 90.

10. An ink according to claim 1 wherein the fluoroelastomer is present in the ink in an amount of from about 0.1 to about 25 percent by weight of the ink.

11. An ink according to claim 1 wherein the crosslinker is a dihydroxy aromatic compound or a metal oxide.

12. An ink according to claim 1 wherein the fluoroelastomer has a glass transition temperature of from about -70° C. to about 25° C.

13. An ink according to claim 1 wherein the ink has a surface tension of from about 22 to about 40 dynes per centimeter.

14. An ink according to claim 1, wherein the crosslinker is a metal oxide.

15. An ink composition comprising:
(a) water;
(b) a cosolvent;
(c) a colorant;
(d) a surfactant; and
(e) a fluoroelastomer;
said ink having a viscosity of 2 centipoise to 20 centipoise at a jetting temperature of 20° C. to 90° C. the ink composition having the characteristic that an imagewise pattern formed on a deformable substrate with the ink composition can be stretched along one axis to at least 110% of the length of its original dimension at least about 50 times without exhibiting cracking or delamination from the substrate.

16. A process which comprises applying a stretchable ink composition of claim 15 to a substrate in an imagewise pattern.

17. A process according to claim 16 wherein the process comprises incorporating the ink into an ink jet printing apparatus and causing droplets of the ink to be ejected in the imagewise pattern onto the substrate.

* * * * *